Feb. 17, 1942.    M. L. ENGLER ET AL    2,273,185
APPARATUS FOR SECURING VALVE STEMS TO RUBBER TUBES
Filed Aug. 27, 1938    3 Sheets-Sheet 1

INVENTORS
MAX L. ENGLER &
WALTER J. BRETH
BY
Evans & McCoy
ATTORNEYS

Feb. 17, 1942. M. L. ENGLER ET AL 2,273,185
APPARATUS FOR SECURING VALVE STEMS TO RUBBER TUBES
Filed Aug. 27, 1938 3 Sheets-Sheet 2
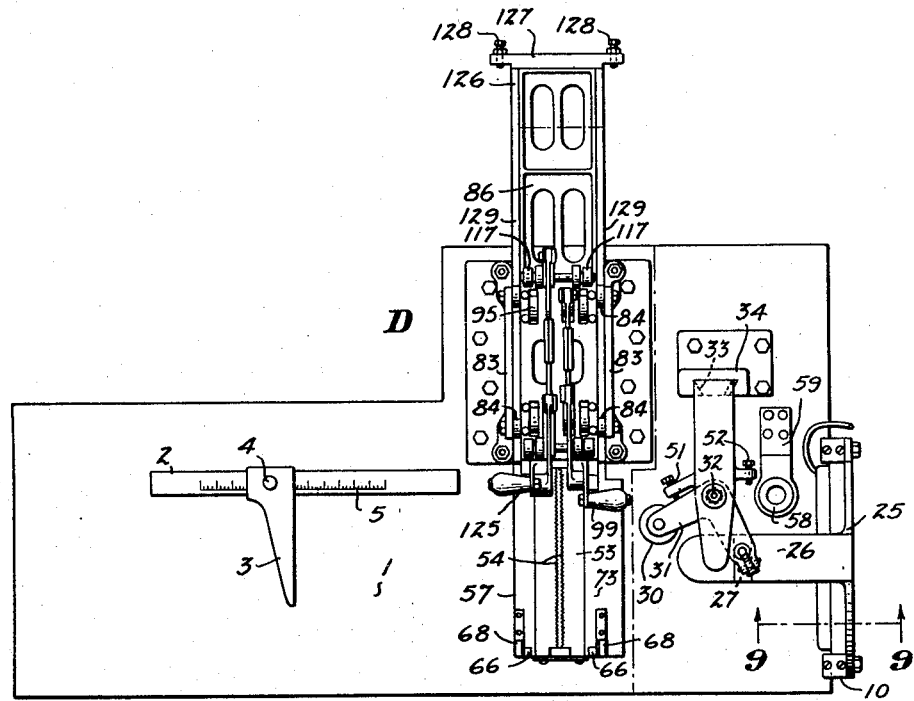
INVENTORS
MAX L. ENGLER &
WALTER J. BRETH
BY
Evans + McCoy
ATTORNEYS Feb. 17, 1942.   M. L. ENGLER ET AL   2,273,185
APPARATUS FOR SECURING VALVE STEMS TO RUBBER TUBES
Filed Aug. 27, 1938   3 Sheets-Sheet 3
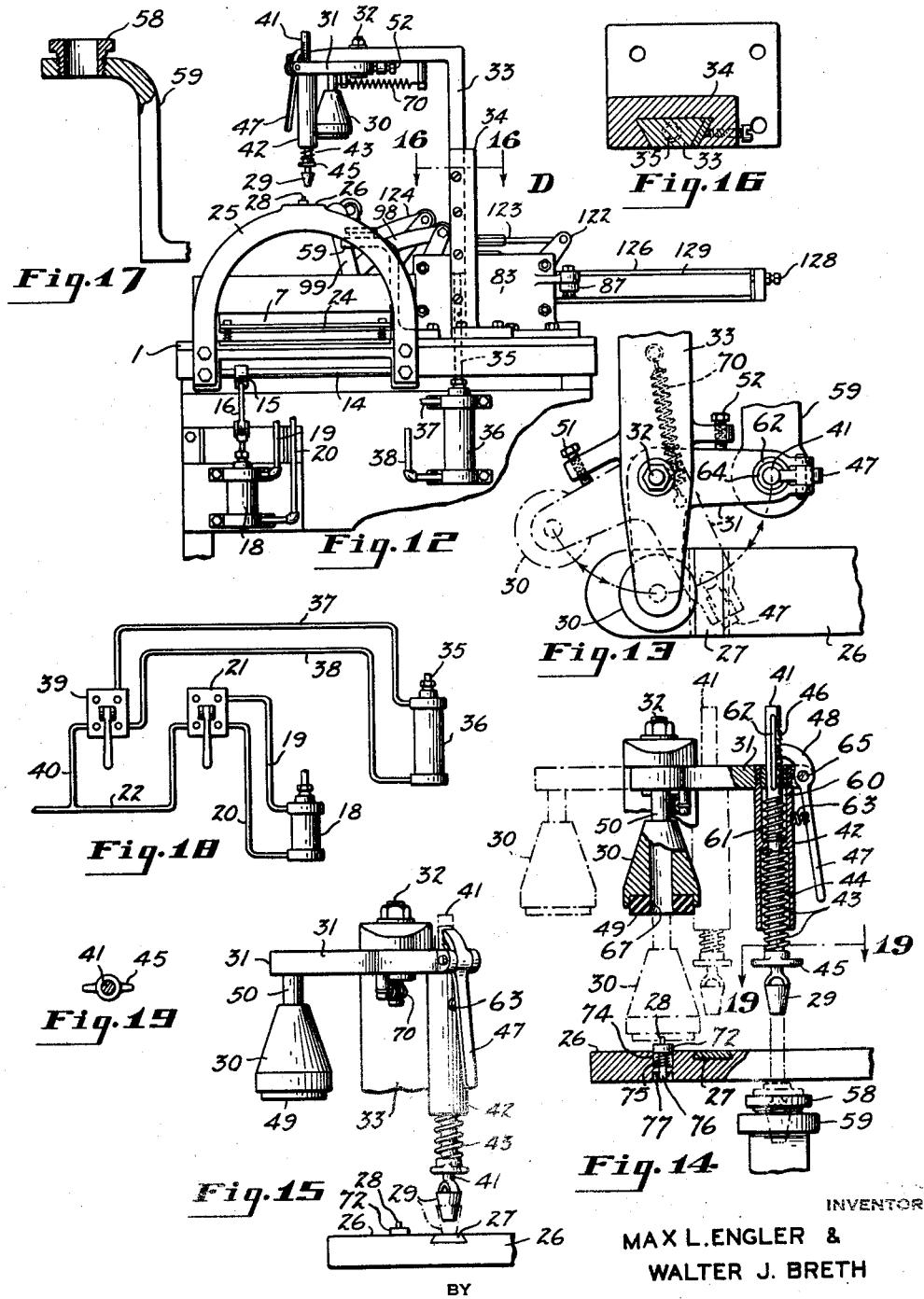
INVENTORS
MAX L. ENGLER &
WALTER J. BRETH Patented Feb. 17, 1942

2,273,185

UNITED STATES PATENT OFFICE 2,273,185

APPARATUS FOR SECURING VALVE STEMS TO RUBBER TUBES

Max L. Engler and Walter J. Breth, Akron, Ohio, assignors to The General Tire & Rubber Company, Akron, Ohio, a corporation of Ohio Application August 27, 1938, Serial No. 227,175

11 Claims. (Cl. 154—9)

This invention relates to apparatus for securing rubber valves to rubber articles, and more particularly to devices of this character for securing rubber base valve stems to the outside of inner tubes for pneumatic vehicle tires.

This application is a continuation in part of our co-pending application Serial No. 52,395 filed November 30, 1935, now Patent 2,186,286, issued January 9, 1940, for Splicing machine, which discloses, in addition to the invention shown and described herein for perforating a tube and attaching to the perforated tube a rubber base valve stem, means for cutting tube stock to suitable length and splicing the severed ends of the tube to form an annulus.

An object of the invention is to provide an apparatus for supporting a rubber tube during the perforating of the same and while a rubber base valve stem is applied and secured to the rubber tube in the region of the perforation.

Another object is to provide, in association with a supporting member or anvil for carrying a rubber tube during the perforation and securing thereto of a rubber base valve stem, means for positioning the tube so that a predetermined area thereof is properly located with respect to devices used for perforating the tube and applying thereto the valve stem.

Another object is to provide, in association with an anvil or supporting member of the character mentioned, a device for supporting and positioning a rubber base valve stem over a predetermined clean area of the inner tube after the latter has been perforated; a more specific and related object being to provide such a supporting and positioning member which is arranged to carry the valve stem in slightly spaced relation above the predetermined clean area of the inner tube so that no portion of the base of the valve stem contacts the rubber of the inner tube until substantially the entire base of the valve stem is forcibly pressed against the clean area of the inner tube by the mechanical presser provided by the invention.

Another object is to provide, in an apparatus for fixing valve stems to rubber tubes, perforating and pressing devices which are movable toward and away from the inner tube while the latter is at an operating station, to perform their respective functions.

Another object is to provide an apparatus of the character described which is simple in design and construction and relatively inexpensive to manufacture and operate. Other objects and advantages will become apparent from the following detailed description of a suitable embodiment of the invention made in connection with the accompanying drawings in which:

Fig. 8 is a plan view of the apparatus of the present invention;

Fig. 9 is a detail elevational view partly in section and with parts removed taken substantially on the line 9—9 of Fig. 8;

Fig. 10 is a front elevational view of the apparatus shown in Fig. 8;

Fig. 11 is a fragmentary detail, partly in section and with parts removed, taken substantially on the line 11—11 of Fig. 9;

Fig. 12 is a fragmentary elevational view, with parts removed, of the apparatus shown in Figs. 8 and 10;

Fig. 13 is a plan view of the perforating and pressing devices shown in Fig. 8 and enlarged with respect thereto;

Fig. 14 is an elevational detail, partly in section and with parts removed, showing the perforating and pressing devices of Fig. 10 and enlarged with respect thereto;

Fig. 15 is a view similar to Fig. 14 showing the perforating or punching device in operative position;

Fig. 16 is a fragmentary sectional detail taken substantially on the line 16—16 of Fig. 12 and enlarged with respect thereto;

Fig. 17 is a fragmentary detail view, partly in section, showing the means for resetting or latching the punch or perforator;

Fig. 18 is a diagrammatic view showing the hydraulic means for operating the tube cutting blade and valve stem pressing means.

Fig. 19 is a sectional detail taken substantially on the line 19—19 of Fig. 14.

Figure 1:
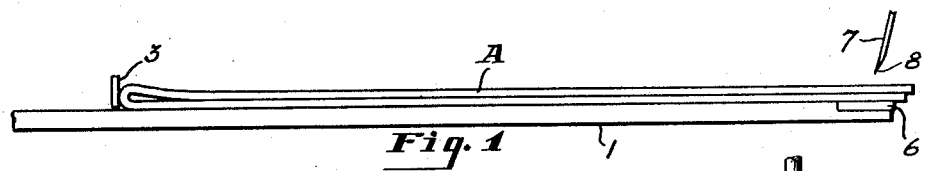
Figure 1 is a diagrammatic elevational view showing a piece of tube stock being cut to length for the manufacture therefrom of a vehicle tire inner tube.

Briefly, the invention comprises a supporting member or anvil which is adapted to be inserted within one end of a length of tube stock A and is provided with an operating station for underlying a predetermined area of the tube while the latter is perforated in said area, the supporting member having at said station an indicator by means of which said predetermined area of the tube can be properly located with respect to the path taken by a reciprocable punching or perforating device mounted for movement toward and away from the anvil. At the operating station is provided a valve stem supporting member which is arranged to project through the perforation C in the tube and support above the surface of the tube a rubber valve stem B preparatory to forcing the valve stem against the predetermined clean area of the tube. The indicator and the valve stem supporting member are advantageously combined in a single element which is also arranged to prevent lateral displacement of the valve stem and the rubber tube during the pressing of the valve against the tube.

The description of a suitable embodiment of the invention will now be made in connection with the accompanying drawings in which like parts throughout the several views are indicated by the same numerals of reference. Those reference numerals to which no reference is made in the present specification indicate parts belonging to the tube splicing and other devices described in our co-pending application mentioned above and which form no part of the present invention.

The apparatus of the invention is preferably mounted on a suitable bench or table 1 at a convenient height above the floor and in front of which the operator stands or is seated. Before applying a rubber valve stem to the tube by means of the apparatus or devices comprehended by the present invention the uncured tubular rubber stock is cut to size. For this purpose the table 1 has a longitudinally extending guide block 2 (Fig. 8) which carries a slidable gauge arm 3. A screw 4 on the arm 3 may be tightened against the guide block 2 to clamp the arm in adjusted position. Desirably a calibrated scale 5 is inscribed on the guide block 2 in measured relation with respect to the cutter to be later described, so that the arm 3 can be accurately set in proper position to measure off a length of tube stock which will form a vehicle tire inner tube of desired circumference.

The arm 3 is arranged parallel to the right hand end of the table 1, as viewed in Figs. 1 and 8, where the tube cutter is located. A cutting plate 6, preferably of brass or similar material, is set into the table 1 and underneath a knife or cutter 7, the plate being arranged to cooperate with cutting edge 8 of the knife to sever the tube stock A.

Vertical slots 9 formed in spaced uprights 10 secured to the table 1 receive the ends of the cutter 7 to guide the latter as it is reciprocated by means of rod members 11 having rack teeth 12, which mesh with pinions 13. The pinions 13 are mounted on a shaft 14 which has an arm 15 actuated by rod 16 connected to plunger 17 in a hydraulic cylinder 18. Plunger rod 17 is arranged to be reciprocated by a piston (not shown) disposed within the cylinder 18. Conduits 19 and 20 lead to opposite ends of the hydraulic cylinder 18 and connect the latter with a valve 21 in accordance with the diagrammatic showing of Fig. 18. A fluid pressure line 22 furnishes a suitable fluid such as air to the valve 21 under pressure so that the operator by manipulation of the valve can selectively feed high pressure fluid to the cylinder 18 through either the conduit 19 or the conduit 20 to raise or lower the knife 7.

Figure 2:
Fig. 2 is a diagrammatic elevational view partly in section and with parts removed showing one end of the tube stock positioned on the supporting member or anvil and about to be perforated.

In cutting the tube stock A to size it is folded over upon itself as shown in Fig. 1 so that the fold abuts against the arm 3, set in proper relation to the knife 7. The valve 21 is then operated to supply fluid pressure through conduit 19 to the hydraulic cylinder 18 forcing the knife 7 toward the shear plate 6 which cuts off the ends of the tube stock. If desired, the cutter may be provided with an electric heating coil 23 and a stripper plate 24 may be arranged to prevent the clinging of severed tube stock to the cutter. One end of the fresh severed tube stock is then raised by the operator and slid over a supporting member or anvil 26 which is disposed above the table 1 as shown in Fig. 2. The tube stock is opened up so that the anvil 26 is received internally of the tube in telescopic fashion and underlies but a single thickness of the material of the tube. The supporting member of anvil extends laterally from an inverted U-shaped member or support 25 which is secured to the right hand end of the table 1 as shown in Fig. 8. The member 25 is disposed against the uprights 10 of the cutter so that it straddles the path of tube stock moving to the left over the cutting plate 6 and onto the table 1. The cutter, therefore, is disposed across the bight between the legs of the support 25, and the anvil 26 which is supported cantilever fashion, overhangs the tube stock on the table 1 prior to and following the cutting of the ends of the rubber material.

The free end of the anvil 26 constitutes an operating station which underlies an area of the tube to which a rubber base valve stem is to be attached.

In commercial operation of a device of the character described herein, it is preferable that the operator be supplied with the tube stock "A" in quantity lots from other departments of the manufacturing concern. Since the tube stock is to be vulcanized subsequent to the attaching thereto of the rubber valve stems and the splicing of the ends of the tube, such stock is raw or semi-cured and hence normally somewhat tacky. Therefore, in accordance with standard practice in rubber manufacturing establishments the lengths of tube stock are preferably coated with a suitable anti-adhesion agent such as soapstone so that the several pieces of rubber tubing do not stick to one another. Before the application of the soapstone to the tube stock, pieces of holland cloth or the like are applied over predetermined areas of the tube to prevent the dusting of such areas with the soapstone. These disks or patches, as they are called, protect the raw or uncured surface of the rubber from the soapstone and retain the tacky or adhesive characteristics of the raw rubber surface. When a rubber base valve stem is to be applied to a tube, the protecting patch is removed from the latter to expose the adhesive surface to which the valve is to be affixed.

At the operating station of the anvil is provided a punch block 27 which is preferably formed of brass so as to prevent injury to the perforating punch to be later described, it being understood that the anvil 26 is constructed of a suitable strong rigid material such as iron or steel so as to form a firm and rigid support for the rubber tube. Adjacent the punch block 27 at the operating station of the anvil is carried a combined indicating device and valve stem centering support 28, which projects above the surface of the anvil to bulge the pliant material of the raw rubber tube adjacent the margin of the predetermined area to which the rubber base valve stem is to be attached. Thus the operator, by visual observation of the bulge, can determine when the predetermined clean area of the tube stock is approximately centered over the punch block 27. As mentioned above, the predetermined clean area of the tube stock is covered by a protective coating of holland cloth or the like which is usually somewhat larger than the base of the valve stem which is to be secured to the tube. Accordingly, only an approximate location of the predetermined tube area with respect to the punch block 27 is required and the distance from the indicator 28 to the center of the punch block 27, against which the cutter 29 is directed, is short enough so that an operator can readily determine by visual observation when the predetermined clean area of the tube is properly located over the punch block.

The operation of fixing a rubber base valve stem to the tube stock comprises first punching the tube stock to provide opening C, and then pressing the valve B in place over the opening. The tube is perforated by a punch 29 and the valve B is forced against the predetermined clean area of the tube by means of a presser member 30. The holland cloth which covers the predetermined clean area of the tube stock as the stock is received by the operator may be removed either before or after the punching operation, in all events being removed before the valve stem is applied so as to expose the underlying tacky or adhesive surface of the raw rubber to the valve stem base.

Carrying member 31 is mounted for pivotal movement in a horizontal plane and has secured at the extremities of a pair of divergent laterally extending arms the assembly for the punch tool 29 and the assembly for the presser tool 30. The member 31 is pivotally mounted on a vertical pivot pin 32 carried by a horizontally disposed portion of a vertically movable arm 33 guided for a substantial vertical distance in a dovetail 34, the latter being secured to the table 1. Arm 33 is reciprocated by a vertical plunger rod 35 extending through the table 1 and into a fluid pressure cylinder 36. A piston or plunger (not shown) is secured on the end of the rod 35 within the cylinder 36. Fluid conduits 37 and 38 connect the cylinder 36 with a suitable control valve 39 diagrammatically shown in Fig. 18. The valve 39 receives high pressure fluid through a conduit 40 from the main pressure line 22 and is arranged to selectively introduce high pressure fluid into the top or bottom of the cylinder 36 through the conduits 37 and 38, respectively.

The cutting element of the punch 29 is preferably in the form of an inverted hollow frusto conical shell. Disks of rubber removed from the tube stock in the perforating operation pass upwardly through the bore of the conical element and are discharged through the top thereof. The cutting element is carried on the lower end of vertical rod 41 slidable in a sleeve 42 secured in the end of one arm of the member 31. In the lower end of the sleeve 42 is a counterbore 44 which receives a helical coil compression spring 43 disposed about the rod 41. The lower end of the spring 43 abuts against a stop collar 45 secured to the rod 41 above the cutting shell of the punch 29, and the upper end of the spring 43 seats against the bottom of the counterbore 44, as shown in Fig. 14. In the upper end of the sleeve 42 is a counterbore 60 which receives a helical compression spring 61 disposed about the upper end of the rod 41. This spring 61 seats on the circumferential collar forming the bottom of the counterbore 60 and the upper end of the spring 61 engages lower ends of guide keys 62 formed on or secured in the rod 41 and extending radially therefrom. The guide keys 62 ride in grooves formed in a plug 64 which is threaded into the upper end of the sleeve 42 and in which the rod 41 has a sliding fit.

Ratchet teeth 46 are formed along one side of the rod 41 at the upper end of the latter and are engaged by pawl shaped end 48 of a latch lever 47 pivoted at 65 in the bifurcated end of the punch carrying arm of the member 31. A compression spring 63 seated in a socket formed in the external surface of the sleeve 42 engages the latch lever 47 to urge the latter in a counterclockwise driection as viewed in Fig. 14 and maintain the pawl shaped end 48 of the lever in engagement with the ratchet teeth 46 of the rod 41. The guide keys 62 prevent rotation of the rod 41 with respect to the sleeve 42 thus keeping the ratchet 46 in alignment with the pawl 48.

The valve pressing tool 30 comprises a substantially frusto conical member having a relatively broad base disposed downwardly and provided with a substantially vertical bore to receive the stem of the valve, as will later appear. Preferably a yieldable pressing element 49 constructed of a suitable relatively soft material such as rubber is secured to the bottom of the presser member and is provided with a central aperture 67 in alignment with the bore through the pressure member. As shown in Fig. 14 the yieldable presser element 49 is shaped for use with valve stems of the character indicated at B of Fig. 4 which have a somewhat conical base or attaching flap 69. For this reason the yieldable member 49 is provided with a relatively flat bottom surface so that the initial engagement between the yieldable presser and the valve stem occurs substantially as a line contact at the central portion of the valve stem base 69 and the central part of the presser 49 surrounding the aperture 67. As continued pressure is exerted on the presser element 49 by the presser 30 the element 49 is somewhat deformed so that the area of contact with the valve stem base 69 gradually increases progressively and radially outward from the center of the valve stem thus forcing out any air that may have been entrapped between the valve base and the rubber of the tube to insure secure attachment of the valve stem to the rubber tube.

The presser 30 is secured to an arm of the horizontally pivoting member 31 by means of a rod 50 so that the presser is carried toward and away from the operating station on the supporting anvil 26 upon each reciprocation of the actuating arm 33. Lateral extensions formed on the arm or actuating member 33 receive adjustable stop screws 51 and 52 which limit the pivotal movement of the horizontal member 31 as shown in Fig. 13. When the member 31 is in the position indicated by the broken lines of Fig. 13 the punch or cutter 29 is disposed in vertical alignment with the punch block 27 of the operating station as shown in elevation in Figs. 2, 10 and 15. In this position the presser carrying arm of the member 31 abuts against the adjusting screw 51. Upon pivotal movement of member 31 in a counter-clockwise direction as viewed in Fig. 13 substantially to the full line position illustrated, the punch carrying arm of the member 31 abuts against adjustable set screw 52 and the presser 30 as disposed above the operating station of the anvil 26 and in vertical alignment with the valve support or indicator 28. A tension spring 70, Fig. 13, is secured to the actuating arm 30 and extends to a pin secured in the under side of the pivoted member 31 on the opposite side of the pivot 32 from the point of attachment of the spring to the actuating arm 33. The spring 70 is arranged to retain the arm 31 in either its full line position or its broken line position indicated in Fig. 13, and prevents pivotal movement of the member 31 during the operation of the mechanism, thus locking the arm in either of its operative positions.

Figure 6:
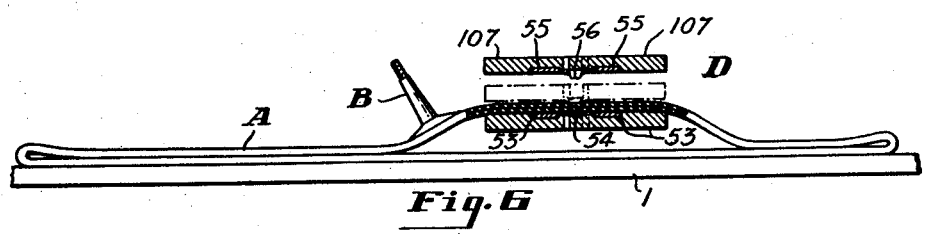
Fig. 6 is a diagrammatic elevational view partly in section and with parts removed showing the splicing of the ends of the tube to form an annulus of the same.

The apparatus for joining the ends of the tube stock together includes a pair of normally spaced lower jaws 53, each having a series of small upwardly projecting teeth 54 at its inner edge, and a pair of normally spaced upper jaws 55, each having a series of small downwardly projecting teeth 56 at its inner edge; see Fig. 6.

Spaced above the table portion 1 there is a substantially horizontal plate 57 formed with a recess on its upper surface across one end. In such recess is a pair of spaced sliding blocks provided with upwardly extending portions 66 having tapered cam surfaces for use in guiding the splicing apparatus described in our copending application. Mounted on the plate 57 outwardly of the upstanding portions 66 is a pair of upstanding portions 68 also employed in the splicing apparatus. Seated over the jaw plates 55 are sliding plates 73 which are slotted to extend around the upstanding portions 68 and are provided at their inner edges with a series of interfitting fingers which perform the splicing operation.

Mounted at one side of the table portion 1 is a pair of upstanding brackets 83, each of which is provided with a series of anti-friction rollers 84. A slidable carriage 86 is mounted between the rollers, horizontal anti-friction rollers 87 being provided at the forward and rearward ends of the brackets 83 for engaging the sides of the carriage. This carriage is thus reciprocable toward and away from the operator in performing the splicing operation. The carriage mounts vertically movable blocks actuated by cams, one of which is indicated at 95. This cam is operable by a lever 99 having connection therewith through a link 98. The movable blocks under the influence of the cams 95 shift plates 107, Fig. 6, downwardly to the broken line position illustrated, carrying the upper jaws 55 against the tube to be spliced. For advancing and retracting the carriage 86, cams 117 are provided which are operated through a link 124 connected to a lever 125. The carriage 86 has a pair of rearwardly extending portions 126 which are interconnected by a transverse portion 127. The portion 127 is provided with spaced adjusting screws 128 which engage with supports for the rollers 87 and limit the forward movement of the carriage. Side portions 129 of the carriage 86 have forwardly projecting fingers which engage in slots of the upwardly extending portion 68 of the plate 57 and prevent upward movement of the forward end of the carriage during the application of pressure in the splicing operation.

In forming opening C in the tube stock A the member 31 is pivoted to a position so that the punch 29 is in alignment with the punch block 27 of the operating station as described above and one end of the tube is placed on the supporting member or anvil 26 so that the predetermined clean area thereof is approximately centered over the punch block 27 as the operator determines by visual observation of the bulge 71 formed in the material of the tube by the indicator 28 at the operating station of the anvil. The operator then presses the lower end of the lever 47 toward the sleeve 42, disengaging the pawl end 48 from the ratchet teeth 46 to release the rod 41. The pressure of the spring 43, which has previously been compressed, drives the rod 41 and punch 29 from their uppermost position, in a downward direction toward the operating station of the anvil with a force sufficient to cause the punch 29 to travel through the wall of the tube stock and form the opening C. The spring 43 is of sufficient strength so that during the punching or perforating operation the spring 61 is compressed. Upon completion of the downward stroke of the punch 29 the compression in the spring 61, which then exerts a greater force on the rod 41 than the spring 43, raises the punch 29 above the level of the tube stock so that the latter can be shifted slightly to the right as viewed in Figs. 2 and 3, so that the aperture C receives the indicator 28.

Figure 3:
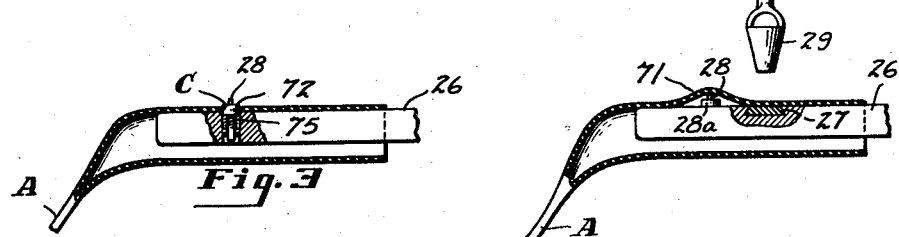
Fig. 3 is a longitudinal sectional view with parts removed showing the perforated tube positioned on the anvil so that the valve stem supporting and centering member projects through the perforation.

As shown in Figs. 3 and 14 the indicator 28 comprises a vertically disposed pin which is secured in and extends upwardly from a plunger 72. The plunger is mounted for vertical movement in a bore 74 formed in the anvil 26 at the operating station, and is normally urged upward by a helical compression spring 75 which is received in the bore 74 below the plunger. The spring is disposed about a reduced diameter portion 76 of the plunger which extends through a hole in the bottom of the bore 74 and receives a transverse pin 77 which limits the upward movement of the indicator and plunger 72.

Figures 4, 5:
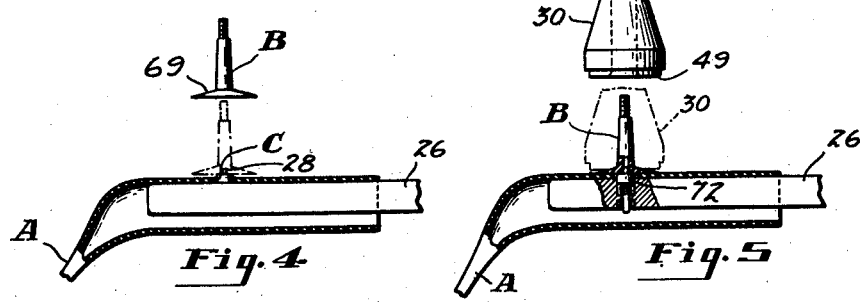
Fig. 4 is a view similar to Fig. 3 showing the step of positioning a rubber base valve stem on the centering member.
Fig. 5 is a view partly in section and with parts removed showing the step of pressing the base of the valve stem against the clean area of the rubber tube about the previously formed perforation in the tube.

The upper surface of the plunger 72, when the latter is disposed within the aperture C, is normally above the level of the surface of the clean area of the tube to which the valve stem is to be attached. The valve stem B, preferably with a coating of rubber cement applied to the under side of the base or attaching flap 69 is then positioned on the plunger 72, being centered thereon by the indicator or centering pin 28 which extends upwardly into the bore of the valve stem, see Fig. 4. In this position the base 69 of the valve stem is above the level of the surface of the clean area of the rubber tube as shown in Fig. 4 so that the cement coated under side of the valve stem base is maintained out of engagement with the tacky tube surface.

The operator then pivots the arm 31 in a counter-clockwise direction as viewed in Fig. 13 substantially to the position shown in solid outline. Thus the valve pressing tool 30 is aligned over the valve centering pin 28 and the valve stem B carried on the plunger 72, see Fig. 5, full lines. After removing the holland cloth or other protective covering from the predetermined clean area of the tube stock the operator then actuates the valve 39 to admit high pressure fluid into the upper end of the cylinder 36 through the conduit 37 to drive the plunger downwardly. This causes the tool 30 to travel downwardly with sufficient force to firmly press the base 69 with the valve body B into firm, intimate contact with the tube stock. During this pressing action initial contact occurs in a circumferential line about the opening 67 in the yieldable presser element 49 and the area of contact between the presser and the valve stem base moves radially outward as the downward force exerted on the presser 30 is increased, see Fig. 5, broken lines. During actual commercial operation, the downward movement of the presser 30 may take place at a relatively high velocity so that to the eye of an observer the gradual deformation of the presser element 49 in a radial direction is not apparent. However, such deformation is inherent in a device constructed in accordance with the invention because of the relatively flat bottom surface on the presser element and the conical upper surface of the valve stem base. Initial line contact is bound to occur at the central portion of the valve stem base. However, this feature of the invention can be effected by numerous other expedients and the particular construction shown is merely illustrative.

A sleeve or stop member 58 is adjustably carried by a supporting bracket 59 secured to the table 1 and positioned so that when the member 31 is in full line position shown in Fig. 13 the punch 29 is in alignment with the sleeve. During the downward movement of the actuating arm or member 33, which occurs each time the presser 30 is actuated to secure a valve stem to a tube, the punch 29 is reset for a subsequent perforating operation by engagement of the collar 45 with the top of the sleeve 58, the rod 41 being held stationary in this manner by the stop collar 45 as the sleeve 42 is forced downwardly thereabout so as to compress the spring 43, and the pawl 48 automatically latches with the ratchet 46 to hold the rod 41 with the spring 43 compressed.

Figure 7:
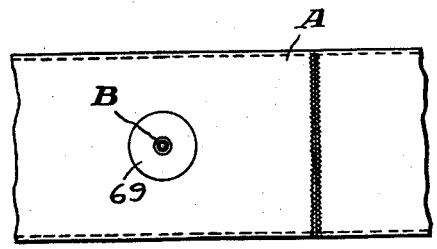
Fig. 7 is a fragmentary plan view with parts broken away showing the joined ends of the tube stock.

After the valve stem B has been secured to the tube stock A the latter is withdrawn from the anvil 26 and the two ends of the tube are secured together by means of splicing apparatus D diagrammatically shown in Fig. 6 and more fully described in my copending application referred to above. If desired, the apparatus described in the present application can also be used with tube splicing devices of the character shown in our co-pending application Serial No. 122,623 filed January 27, 1937. The completed splice appears as shown in Fig. 7 with the valve stem secured to the tube a short distance from the splice.

The present invention thus provides means for supporting one wall of a rubber tube during the perforating of the latter in a predetermined clean area and while a rubber valve stem is pressed into adhering contact with said predetermined clean area in alignment with the perforation. A shiftable member, carrying perforating and pressing devices, is movable toward and away from an operating station of the supporting means and is arranged to be locked in position with either the perforator or the presser in alignment with the operating station so as to accurately determine the relationship between the rubber tube and the devices operating thereon. Means is provided for locating a predetermined clean area of the rubber tube with respect to the line of movement of the perforator and the same means advantageously serves as a locating means for centering and holding the valve stem during the pressing of the latter into adhering contact with the perforated rubber tube. Additionally, the apparatus provides means by which the perforating tool is automatically actuated so as to be reset for a subsequent perforating operation at each movement of the presser member securing a valve stem to a rubber tube.

Other modes of utilizing the principles of the present invention may be resorted to, change being made in the details of construction as desired, it being understood that the particular apparatus shown in the drawings and described above are given for purposes of illustration, numerous alterations and modifications being contemplated.

What we claim is:

1. Apparatus for securing a rubber base valve stem to a tube having a hole therein, comprising an anvil to extend into the tube, and a holder and resilient means supporting the same on the anvil, said holder having valve stem engaging means normally extending above the top of the anvil and through the hole in a tube on the anvil to support a valve stem above and spaced from the surface of such tube to which the valve stem is to be attached, and said holder being movable with the valve stem as the base of the latter is pressed against the tube.

2. In valve attaching apparatus, an anvil, a punch and a reciprocable member for carrying the same movable toward and away from the anvil, a support for said member, a first spring interposed between the support and the reciprocable member to normally urge the member and punch toward the anvil, a second spring interposed between the support and the reciprocable member in opposition to the first spring, said springs being arranged so that the second spring is energized by the inertia of the reciprocable member moving under the influence of the first spring and operates to retract the reciprocable member to withdraw the punch from the anvil, and latch means for holding the reciprocable member with the punch withdrawn from the anvil and the first spring under compression.

3. In valve attaching apparatus, an anvil, a punch and a reciprocable member for carrying the same movable toward and away from the anvil, a support for said member, a first spring interposed between the support and the reciprocable member to normally urge the member and punch toward the anvil, a second spring interposed between the support and the reciprocable member in opposition to the first spring, said spring being arranged so that the second spring is energized by the inertia of the reciprocable member moving under the influence of the first spring and operates to retract the reciprocable member to withdraw the punch from the anvil, and means including a ratchet and latch mechanism for holding the reciprocable member with the punch withdrawn from the anvil whereby the retraction of the reciprocable member by the second spring is continued until the movement thereof is arrested by the first spring and the latch thereupon engages the ratchet to prevent movement of the reciprocable member toward the anvil.

4. Apparatus for making a valve hole in a rubber tube comprising an anvil to receive the tube, a punch and a reciprocable member for carrying the same mounted for movement toward and away from the anvil, a support for the reciprocable member, a spring interposed between the support and the member to normally urge the latter toward the anvil, power driven means having connection with the member to move the same against the force of the spring to retracted position, and releasable means for retaining the reciprocable member in said position, whereby the energy of the spring, upon release of the reciprocable member by the retaining means, forces the punch toward the anvil.

5. Apparatus for attaching valves to tubes comprising an anvil to receive a tube, a carrying member and means supporting the same for movement toward and away from the anvil, a support on the carrying member having a punch supported thereby for relative movement toward and away from the anvil, a spring interposed between the support and the punch for normally urging the latter toward the anvil, a presser on the carrying member, power means for actuating the carrying means to move the presser toward the anvil, and means coacting with the punch to energize the spring upon said actuation of the carrying means.

6. Apparatus for attaching valves to tubes comprising an anvil to receive a tube, a carrying member and means supporting the same for movement toward and away from the anvil, a support on the carrying member having a punch supported thereby for relative movement toward and away from the anvil, a spring interposed between the support and the punch for normally urging the latter toward the anvil, a presser on the carrying member, power means for actuating the carrying means to move the presser toward the anvil, means coacting with the punch to energize the spring upon said actuation of the carrying means, and latch means for releasably retaining the punch with the spring in energized condition, whereby actuation of the carrying means operates the presser and simultaneously energizes the punch actuating spring for subsequent release as desired to drive the punch toward the anvil.

7. Apparatus for attaching valves to tubes comprising an anvil to receive a tube, a carrying member and means supporting the same for movement toward and away from the anvil, a support on the carrying member having a punch supported thereby for relative movement toward and away from the anvil, a spring interposed between the support and the punch for normally urging the latter toward the anvil, a presser on the carrying member, power means for actuating the carrying means to move the presser toward the anvil, a stop engageable with the punch to hold the same as the carrying member and presser are moved toward the anvil to thereby energize the spring, and latch means for releasably retaining the punch with the spring energized.

8. Apparatus for attaching valves to tubes comprising an anvil to receive a tube, a carrying member having a presser and a punch mounted thereon in spaced relation, an actuating member and power means for operating the same, said carrying member being shiftably secured on the actuating member for alternatively positioning the presser or the punch in operative relation to the anvil, a spring in the punch mounting, and a stop engageable with the punch upon operation of the actuating member with the presser in operative relation to the anvil to arrest the movement of the punch and energize the spring.

9. In valve attaching apparatus, an anvil to receive a rubber tube, a plunger recessed in the anvil and normally extending above the surface thereof to project through the valve hole of a tube on the anvil, resilient means for supporting the plunger in extended position and yieldable to permit depression of the plunger to substantially the level of the anvil, and a pin projecting upwardly and receivable within the air passage of a valve stem to position such stem centrally on the plunger to be supported thereby above the level of the tube on the anvil.

10. In valve attaching apparatus, an anvil having an operating station to receive a rubber tube, an actuating member, a carrying member having a punch and an operating spring mounted thereon, a stop and means supporting the same at one side of said station, said carrying member being shiftable on the actuating member to move the punch from a position in vertical alignment with the station to a position in vertical alignment with the stop, and power means for moving the actuating member vertically to force the punch against the stop and thereby energize the punch spring.

11. In valve attaching apparatus, an anvil, a punch and a reciprocable member for carrying the same from a retracted position toward and against the anvil and return, a support for said member, a first spring interposed between the support and the reciprocable member to urge the member and the punch from retracted position toward the anvil, and a second spring interposed between the support and the reciprocable member in opposition to the first spring, said second spring having connection with the reciprocable member to be stressed and energized by the movement of the latter toward the anvil under the influence of the first spring and to then retract the reciprocable member to withdraw the punch from the anvil.

MAX L. ENGLER.
WALTER J. BRETH.